May 22, 1962 W. W. DYER 3,035,850
UNIVERSAL BEARING-PIN STEERING KNUCKLE ASSEMBLY
Filed Oct. 25, 1960
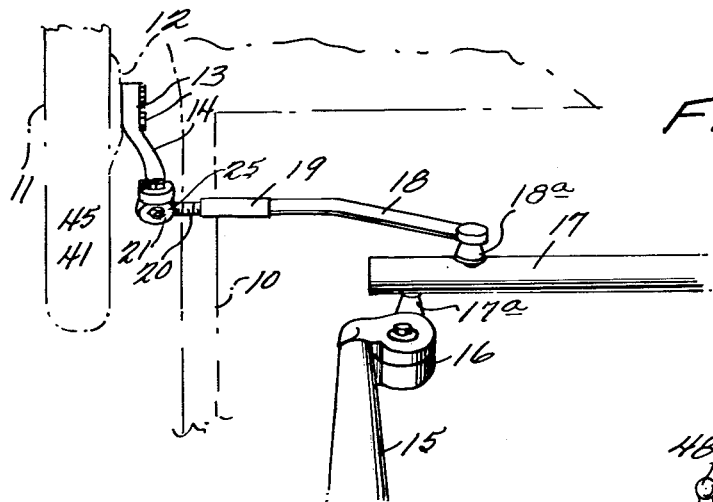
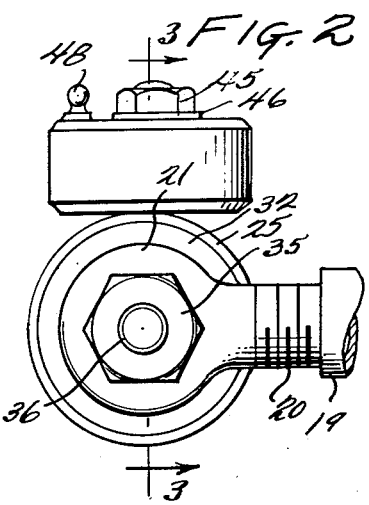
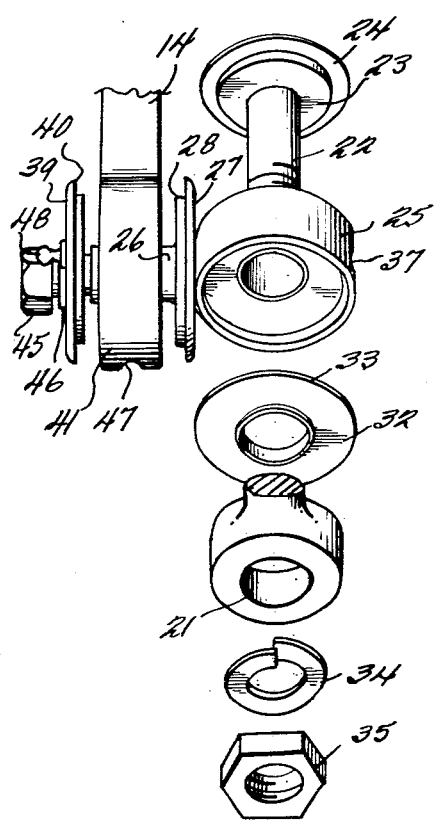
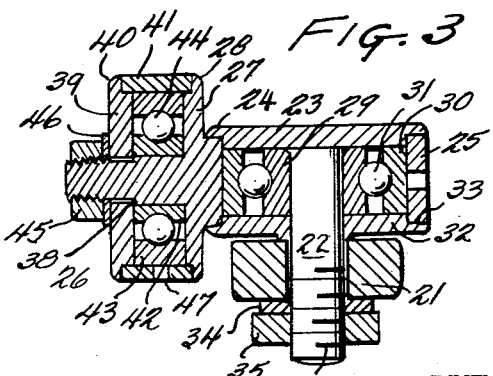
INVENTOR
WOODROW W. DYER
BY Kimmel & Crowell
ATTORNEYS

3,035,850
UNIVERSAL BEARING-PIN STEERING KNUCKLE ASSEMBLY
Woodrow W. Dyer, R.F.D. 2, Blairsville, Ga.
Filed Oct. 25, 1960, Ser. No. 64,870
2 Claims. (Cl. 280—95)

This invention relates to a universal bearing-pin and steering knuckle assembly whereby the connection between the cross arm, tie rod and adjusting pin to the steering knuckle is universally mounted in order to provide effective steering regardless of the vertical reciprocatory movement of the front wheels occasioned by unevenness or irregularity in the road surface.

A further important object of the invention is the provision of a universal bearing-pin and steering knuckle of this character which is so arranged that in the event of breakage of any of the component parts, particularly the bearing-pin, the horizontal arrangement of the bearing-pin will preclude a previous fallacy in connections of this type in that the immediate disassembly of the bearing-pin in the steering knuckle by gravity, as in vertical mounting, is precluded, and time is afforded to bring the vehicle to a stop.

A further object of the invention is the provision of an assembly of this character which is sturdy and durable in construction, reliable and efficient in operation, and relatively simple to manufacture, assemble and install.

Still other objects reside in the combinations of elements, arrangements of parts, and features of construction, all as will be more fully pointed out in the accompanying drawing wherein there is shown a preferred embodiment of this inventive concept.

In the drawings:

FIGURE 1 is a perspective view of the assembly of the instant invention as connected between the steering knuckle and a tie rod, parts of the associated vehicle being schematically indicated in dotted lines.

FIGURE 2 is a side elevation of the assembly of FIG. 1.

FIGURE 3 is a sectional view taken substantially along the line 3—3 of FIG. 2 as viewed in the direction indicated by the arrows; and FIGURE 4 is an exploded perspective view of the component parts.

Similar reference characters refer to similar parts throughout the several views of the drawing.

Referring now to the drawings in detail, and more particularly to FIG. 1, there is schematically indicated at 10 the forward portion of the frame of a motor vehicle, provided with a single front wheel 11 having a brake drum 12, to which is secured as by means of bolts 13 a steering knuckle 14. The vehicle includes a steering rod 15, a steering box 16, and a cross arm 17 connected to the steering box 16 by means of the usual pitman 17a.

It is to be understood that the apparatus to be hereinafter described is duplicated on the opposite side of the motor vehicle.

A tie rod 18 is pivotally mounted on a conventional mounting 18a on the cross arm 17, and has at its end the usual adjusting rod 19, which carries a threaded adjusting pin 20. Adjusting pin 20 is provided at its outer end with an eye 21, which engages a bearing pin 22, which is provided with an integral end plate 23 having a flange 24. The flange 24 seats within an annulus 25 which comprises an integral portion of a second bearing pin 26, which is also provided with an end plate 27 and a flange 28 integrally associated with annulus 25, the purpose of which will be more fully described hereinafter.

Positioned interiorly of annulus 25 and surrounding bearing pin 22 is a bearing assembly comprised of an inner race 29 and an outer race 30 having the conventional balls or other bearings 31 positioned therebetween. A closure washer 32 flanged as at 33 seats against the side of annulus 25 opposite the plate 23, adjacent the eye 21. The assembly is held in position by means of a locking washer 34 and a locking nut 35 engaging the threaded end 36 of bearing pin 22, all as best shown in FIG. 3.

A suitable lubricant fitting may seat in an opening 37 in annulus 25, or may otherwise be suitably positioned, the lubricant fitting being not shown.

The second steering pin 26 is provided with a shoulder 38, against which seats a closure plate 39 flanged as at 40 to engage the rim of an eye 41 formed on the end of steering knuckle 14. A bearing assembly comprised of an inner race 42 and an outer race 43 with the usual ball or other bearings 44 positioned therebetween is provided interiorly of the eye 41. The assembly is held in position by means of a lock nut 45 as well as the usual lock washer assembly 46.

A lubricant opening 47 is provided in the wall of eye 21, and a grease fitting 48 is positioned on plate 39 to insure proper lubrication of the assembly.

It will thus be seen that the first bearing assembly surrounding bearing pin 22 provides for full rotative movement in one direction, while the second bearing assembly surrounding bearing pin 26 provides for complete rotation in a plane perpendicular to that of the first bearing assembly. By means of this universal arrangement effective steering may be provided regardless of the vertical position of the wheels 11 occasioned by inequalities in the road or the like.

From the foregoing it will now be seen that there is herein provided an improved universal bearing pin steering knuckle assembly which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a universal bearing-pin steering knuckle assembly, the combination of a tie rod, an adjusting pin secured to said tie rod, an eye on said adjusting pin, a bearing pin extending through said eye, a bearing assembly surrounding said bearing pin, an annulus retaining said bearing assembly, an enlarged end portion on said bearing pin closing one side of said annulus, a disc having a centrally disposed opening through which said bearing pin extends closing the other side of said annulus, means securing said bearing pin in said eye, a second bearing pin having an enlarged end portion fixed to said annulus and rotatable in a plane perpendicular to the axis of said bearing pin, a steering knuckle adapted to be secured to a wheel assembly, said steering knuckle having an eye on the unsecured end thereof surrounding said second bearing pin, a second bearing assembly on said second bearing pin retained by said eye on said steering knuckle, the enlarged end portion of said second bearing pin closing one side of the eye of said steering knuckle, a disc having a centrally disposed opening through said second bearing pin extends closing the other side of the eye of said steering knuckle, and means for retaining said last-mentioned eye on said second bearing pin.

2. In a universal bearing-pin steering knuckle assembly, the combination of a tie rod, an adjusting pin secured to said tie rod, an eye on said adjusting pin, a bearing pin extending through said eye, a bearing assembly surrounding said bearing pin, an annulus retaining said bearing assembly, an enlarged end portion on said bearing pin closing one side of said annulus, a disc having a centrally disposed opening through which said bearing pin extends closing the other side of said annulus, means securing said bearing pin in said eye, a second bearing pin having an enlarged end portion fixed to said annulus and rotatable in a plane perpendicular to the axis of said bearing pin, a steering knuckle adapted to be secured to a wheel assembly, said steering knuckle having an eye on the unsecured end thereof surrounding said second bearing pin, a second bearing assembly on said second bearing pin retained by said eye on said steering knuckle, the enlarged end portion of said second bearing pin closing one side of the eye of said steering knuckle, a disc having a centrally disposed opening through said second bearing pin extends closing the other side of the eye of said steering knuckle, and means for retaining said last-mentioned eye on said second bearing pin, said annulus and said eye on said steering knuckle having lubricating openings therein.

References Cited in the file of this patent

UNITED STATES PATENTS

| | | |
|---|---|---|
| 1,451,040 | Gulick | Apr. 10, 1923 |
| 2,502,925 | Case | Apr. 4, 1950 |